US010585525B2

(12) United States Patent
Liu et al.

(10) Patent No.: US 10,585,525 B2
(45) Date of Patent: Mar. 10, 2020

(54) ADAPTIVE NOTIFICATION MODIFICATIONS FOR TOUCHSCREEN INTERFACES

(71) Applicant: International Business Machines Corporation, Armonk, NY (US)

(72) Inventors: Su Liu, Austin, TX (US); Eric J. Rozner, Austin, TX (US); Inseok Hwang, Austin, TX (US); Kanak Behari Agarwal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/894,784

(22) Filed: Feb. 12, 2018

(65) Prior Publication Data

US 2019/0250755 A1   Aug. 15, 2019

(51) Int. Cl.
*G06F 3/041* (2006.01)

(52) U.S. Cl.
CPC .. *G06F 3/0416* (2013.01); *G06F 2203/04101* (2013.01)

(58) Field of Classification Search
CPC ......... G06F 3/0416; G06F 2203/04101; G06F 3/04883; G06F 2203/04104; G06F 2203/04808; G06F 3/016; G06F 3/04817; G06F 3/0482; G06F 3/04842; G06F 1/1615; G06F 1/1674; G06F 2203/04805; G06F 2203/04806; G06F 3/03547; G06F 3/0412; G06F 3/042; G06F 3/0481; G06F 3/04812; G06F 3/0483; G06F 3/04845; G06F 3/0485; G06F 3/0488; G06F 3/04886
See application file for complete search history.

(56) References Cited

U.S. PATENT DOCUMENTS

| 7,340,077 B2 | 3/2008 | Gokturk et al. |
| 7,653,883 B2 | 1/2010 | Hotelling et al. |

(Continued)

OTHER PUBLICATIONS

You et al., "SymmetriSense: Enabling Near-Surface Interactivity on Glossy Surfaces using a Single Commodity Smartphone," CHI '16, ACM, May 2016, pp. 1-12.

(Continued)

*Primary Examiner* — Dmitriy Bolotin
(74) *Attorney, Agent, or Firm* — Zilka-Kotab, P.C.

(57) ABSTRACT

In one embodiment, a method includes determining that a notification is to be displayed on a first portion of a touchscreen of a first computing device. The method also includes determining a point on a surface of the touchscreen in which a user of the first computing device intends to imminently touch the touchscreen. Also, the method includes determining whether a second portion of the touchscreen includes a currently-displayed interactive touch component, the second portion of the touchscreen being defined by the point and predetermined areas of the touchscreen adjacent to and surrounding the point. Moreover, the method includes modifying at least one aspect of the notification in response to a determination that the second portion of the touchscreen includes and/or overlaps with the first portion of the touchscreen. Additional embodiments for adaptively modifying notification settings for implementation on a touchscreen display are also described.

20 Claims, 5 Drawing Sheets

(56) References Cited

U.S. PATENT DOCUMENTS

| | | | |
|---|---|---|---|
| 7,665,041 | B2 | 2/2010 | Wilson et al. |
| 8,086,971 | B2 | 12/2011 | Radivojevic et al. |
| 8,180,114 | B2 | 5/2012 | Nishihara et al. |
| 8,232,990 | B2 | 7/2012 | King et al. |
| 8,686,943 | B1 | 4/2014 | Rafii |
| 8,773,512 | B1 | 7/2014 | Rafii |
| 8,854,433 | B1 | 10/2014 | Rafii |
| 9,069,417 | B2 | 6/2015 | Rimon et al. |
| 9,084,082 | B2 | 7/2015 | Barrand |
| 9,283,486 | B2 | 3/2016 | Morioka |
| 9,373,184 | B2 | 6/2016 | Zimmer et al. |
| 9,484,046 | B2 | 11/2016 | Knudson et al. |
| 2002/0140633 | A1 | 10/2002 | Rafii et al. |
| 2009/0103780 | A1 | 4/2009 | Nishihara et al. |
| 2010/0199228 | A1 | 8/2010 | Latta et al. |
| 2011/0173574 | A1 | 7/2011 | Clavin et al. |
| 2011/0219340 | A1 | 9/2011 | Pathangay et al. |
| 2012/0204133 | A1 | 8/2012 | Guendelman et al. |
| 2012/0229399 | A1* | 9/2012 | Kobayashi ............ G06F 3/0486 345/173 |
| 2012/0274550 | A1 | 11/2012 | Campbell et al. |
| 2013/0102281 | A1* | 4/2013 | Kanda ..................... G06F 21/36 455/410 |
| 2014/0155123 | A1* | 6/2014 | Lee .................. H04M 1/72519 455/563 |
| 2014/0347294 | A1* | 11/2014 | Hong .................... G06F 1/3262 345/173 |
| 2014/0370938 | A1* | 12/2014 | Lee .................. H04M 1/72583 455/566 |
| 2015/0019338 | A1 | 1/2015 | Sotomayor |
| 2015/0046267 | A1 | 2/2015 | MacTiernan et al. |
| 2015/0177970 | A1* | 6/2015 | Choi .................. H04L 12/1895 715/752 |
| 2015/0348513 | A1 | 12/2015 | Grimme et al. |
| 2016/0103554 | A1* | 4/2016 | Moriai .................. G06F 3/0488 345/173 |
| 2016/0259413 | A1 | 9/2016 | Anzures et al. |
| 2016/0342574 | A1 | 11/2016 | Zhang et al. |
| 2016/0372085 | A1 | 12/2016 | Lee et al. |
| 2017/0153705 | A1* | 6/2017 | Kim ....................... G06F 3/016 |
| 2017/0193489 | A1* | 7/2017 | Jeon ...................... G06F 3/0346 |
| 2017/0235483 | A1 | 8/2017 | Alonso Ruiz et al. |
| 2018/0032203 | A1 | 2/2018 | Sepulveda et al. |

OTHER PUBLICATIONS

Goel et al., "WalkType: Using Accelerometer Data to Accommodate Situational Impairments in Mobile Touch Screen Text Entry," CHI 2012, Session: Touch Text Entry, May 2012, pp. 2687-2696.

Liu et al., U.S. Appl. No. 16/665,447, filed Oct. 28, 2019.

* cited by examiner

ADAPTIVE NOTIFICATION MODIFICATIONS FOR TOUCHSCREEN INTERFACES

BACKGROUND

The present invention relates to touchscreen interfaces, and more particularly, to adaptively modifying notifications for display on touchscreen interfaces.

Current touchscreen displays and interfaces are able to detect touch input from a user (the location where the user touches the surface of the screen), along with other related parameters, such as touch pressure, length of touch, movement of touch across the screen, etc.

However, current touchscreen displays and interfaces are not able to discern a user's intent when making such a touch. Therefore, when notifications are displayed on a touchscreen while a user is interacting with some other element displayed on the touchscreen or is about to interact with the other element displayed on the touchscreen, accidental touches may occur. These are not desirable events, and may cause adverse consequences for the user, such as replying to a message unintentionally, answering or placing a telephone call to someone the user does not want to speak to, etc. Therefore, elimination of the possibility of such accidental touches when displaying notifications would be greatly beneficial to enhance the usability of touchscreen displays.

SUMMARY

In one embodiment, a method includes determining that a notification is to be displayed on a first portion of a touchscreen of a first computing device. The method also includes determining a point on a surface of the touchscreen in which a user of the first computing device intends to imminently touch the touchscreen. Also, the method includes determining whether a second portion of the touchscreen includes a currently-displayed interactive touch component, the second portion of the touchscreen being defined by the point and predetermined areas of the touchscreen adjacent to and surrounding the point. Moreover, the method includes modifying at least one aspect of the notification in response to a determination that the second portion of the touchscreen includes and/or overlaps with the first portion of the touchscreen.

According to another embodiment, a computer program product includes a computer readable storage medium having program instructions embodied therewith. The computer readable storage medium is not a transitory signal per se, and the embodied program instructions are executable by a processing circuit to cause the processing circuit to determine, by the processing circuit, that a notification is to be displayed on a first portion of a touchscreen of a first computing device. Also, the embodied program instructions are executable by the processing circuit to cause the processing circuit to determine, by the processing circuit, a point on a surface of the touchscreen in which a user of the first computing device intends to imminently touch the touchscreen. In addition, the embodied program instructions are executable by the processing circuit to cause the processing circuit to determine, by the processing circuit, whether a second portion of the touchscreen includes a currently-displayed interactive touch component, the second portion of the touchscreen being defined by the point and predetermined areas of the touchscreen adjacent to and surrounding the point. Moreover, the embodied program instructions are executable by the processing circuit to cause the processing circuit to modify, by the processing circuit, at least one aspect of the notification in response to a determination that the second portion of the touchscreen includes and/or overlaps with the first portion of the touchscreen.

According to yet another embodiment, a system includes a processing circuit and logic integrated with and/or executable by the processing circuit. The logic when executed by the processing circuit causes the processing circuit to determine that a notification is to be displayed on a first portion of a touchscreen of a first computing device. Also, the logic causes the processing circuit to determine a point on a surface of the touchscreen in which a user of the first computing device intends to imminently touch the touchscreen. In addition, the logic causes the processing circuit to determine whether a second portion of the touchscreen includes a currently-displayed interactive touch component, the second portion of the touchscreen being defined by the point and predetermined areas of the touchscreen adjacent to and surrounding the point. Moreover, the logic causes the processing circuit to modify at least one aspect of the notification in response to a determination that the second portion of the touchscreen includes and/or overlaps with the first portion of the touchscreen.

Other aspects and embodiments of the present invention will become apparent from the following detailed description, which, when taken in conjunction with the drawings, illustrate by way of example the principles of the invention.

DETAILED DESCRIPTION

Figure 1:
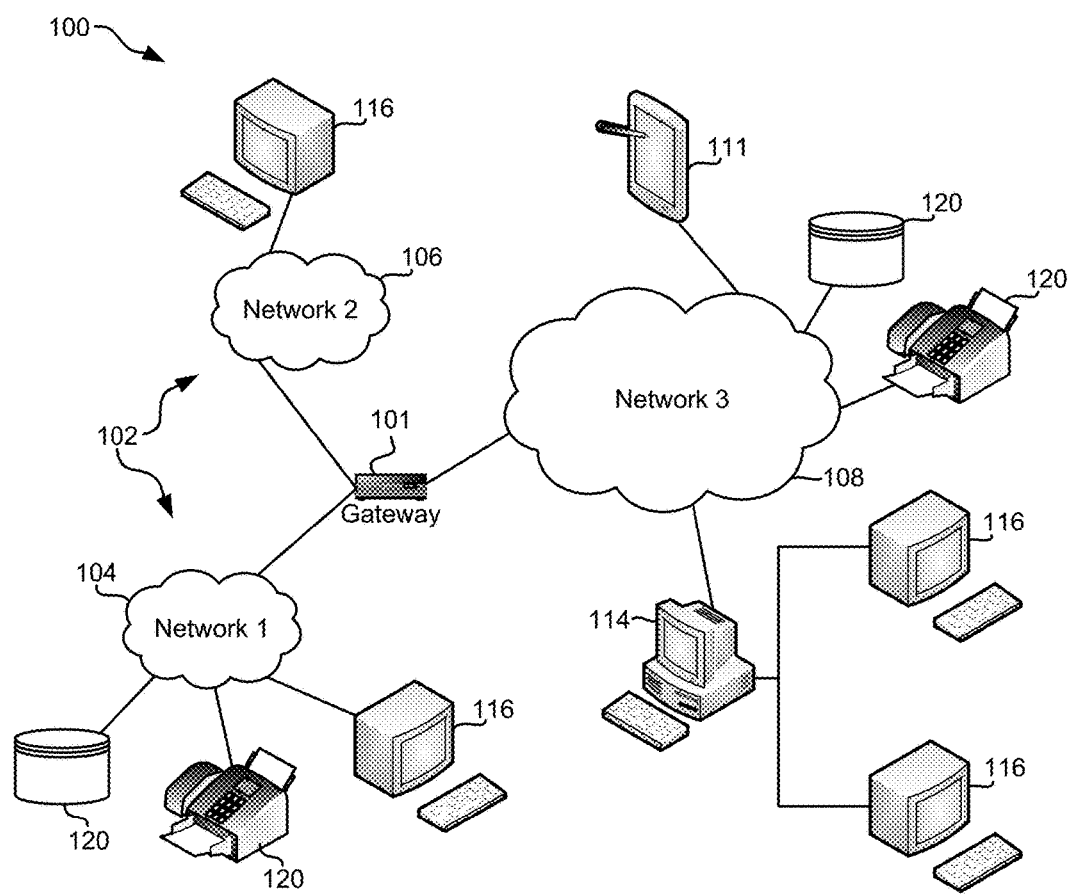
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for providing adaptively modifying notification settings for implementation on a touchscreen display that more intuitively utilize display capacity of the touchscreen.

In one general embodiment, a method includes determining that a notification is to be displayed on a first portion of a touchscreen of a first computing device. The method also includes determining a point on a surface of the touchscreen in which a user of the first computing device intends to imminently touch the touchscreen. Also, the method includes determining whether a second portion of the touchscreen includes a currently-displayed interactive touch component, the second portion of the touchscreen being defined by the point and predetermined areas of the touchscreen adjacent to and surrounding the point. Moreover, the method includes modifying at least one aspect of the notification in response to a determination that the second portion of the touchscreen includes and/or overlaps with the first portion of the touchscreen.

According to another general embodiment, a computer program product includes a computer readable storage medium having program instructions embodied therewith. The computer readable storage medium is not a transitory signal per se, and the embodied program instructions are executable by a processing circuit to cause the processing circuit to determine, by the processing circuit, that a notification is to be displayed on a first portion of a touchscreen of a first computing device. Also, the embodied program instructions are executable by the processing circuit to cause the processing circuit to determine, by the processing circuit, a point on a surface of the touchscreen in which a user of the first computing device intends to imminently touch the touchscreen. In addition, the embodied program instructions are executable by the processing circuit to cause the processing circuit to determine, by the processing circuit, whether a second portion of the touchscreen includes a currently-displayed interactive touch component, the second portion of the touchscreen being defined by the point and predetermined areas of the touchscreen adjacent to and surrounding the point. Moreover, the embodied program instructions are executable by the processing circuit to cause the processing circuit to modify, by the processing circuit, at least one aspect of the notification in response to a determination that the second portion of the touchscreen includes and/or overlaps with the first portion of the touchscreen.

According to yet another general embodiment, a system includes a processing circuit and logic integrated with and/or executable by the processing circuit. The logic when executed by the processing circuit causes the processing circuit to determine that a notification is to be displayed on a first portion of a touchscreen of a first computing device. Also, the logic causes the processing circuit to determine a point on a surface of the touchscreen in which a user of the first computing device intends to imminently touch the touchscreen. In addition, the logic causes the processing circuit to determine whether a second portion of the touchscreen includes a currently-displayed interactive touch component, the second portion of the touchscreen being defined by the point and predetermined areas of the touchscreen adjacent to and surrounding the point. Moreover, the logic causes the processing circuit to modify at least one aspect of the notification in response to a determination that the second portion of the touchscreen includes and/or overlaps with the first portion of the touchscreen.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, or any other type of logic. It should be noted that a user device 111 may also be directly coupled to any of the networks, in one embodiment.

The user device 111 may be any type of device known in the art, such as a workstation, laptop computer, mobile telephone, smartphone, personal digital assistant, tablet computer, smartwatch, etc. In a specific embodiment, the user device 111 may be a device which includes a processing circuit and a touchscreen interface for providing output to and receiving input from a user of the user device 111.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
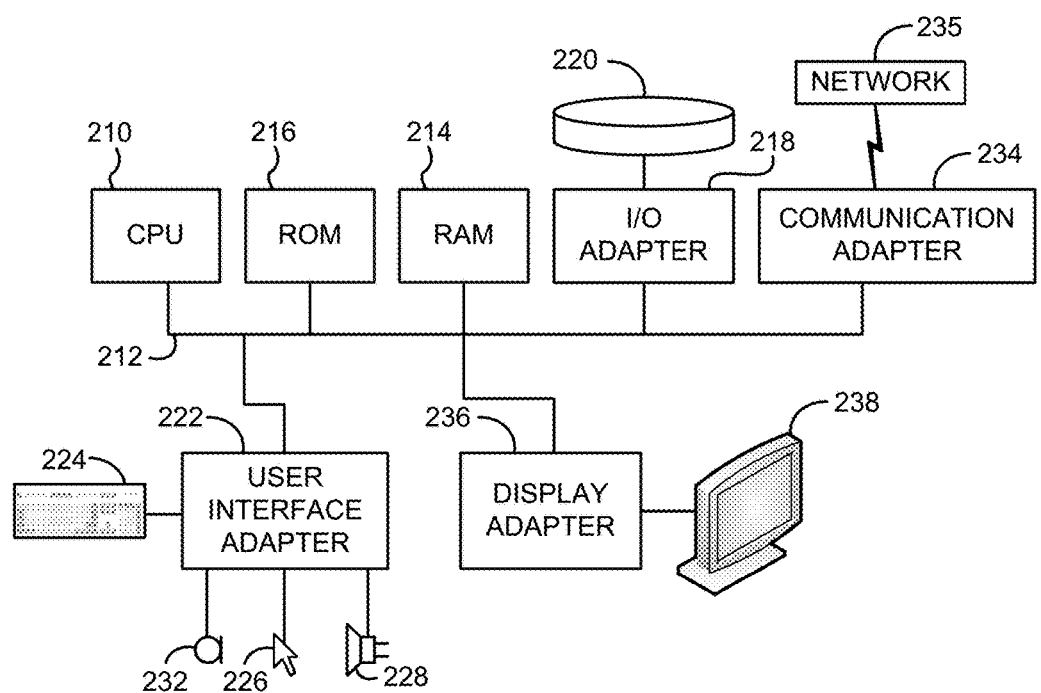
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
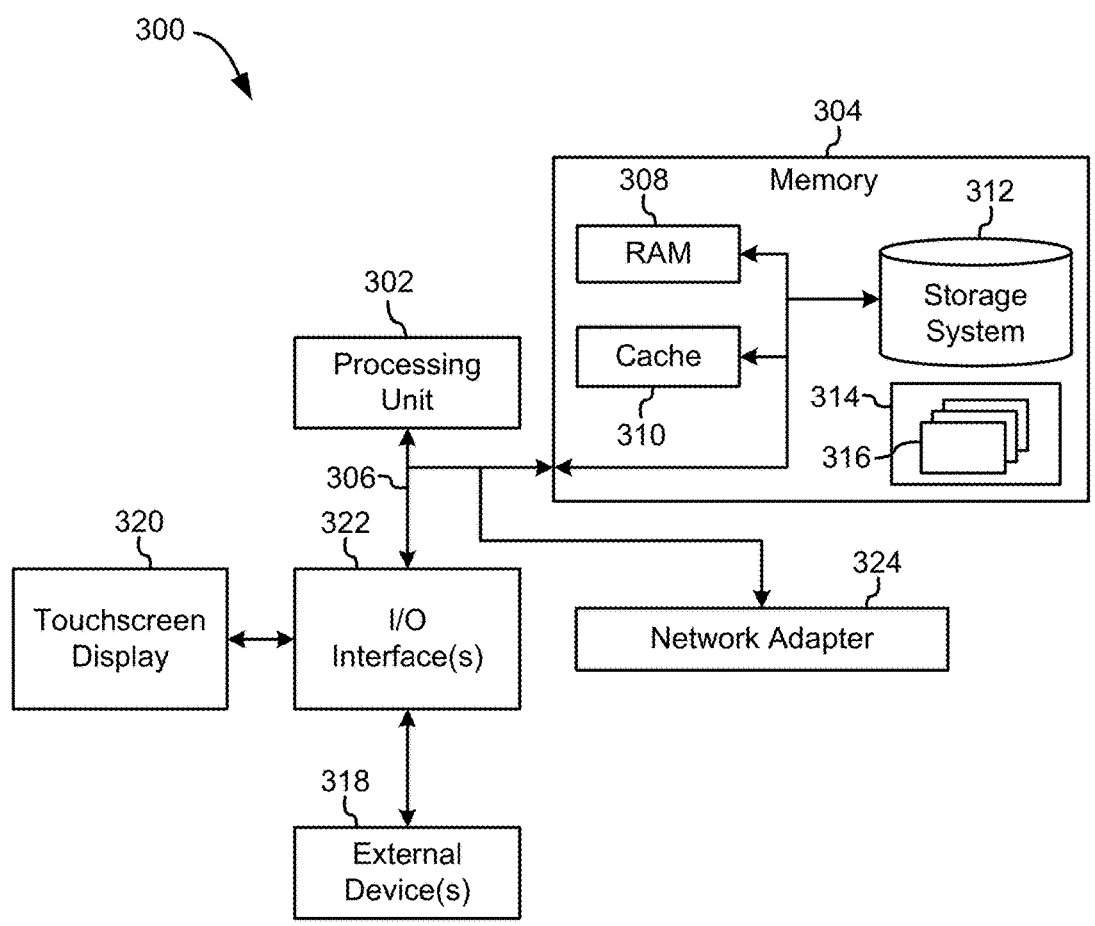
FIG. 3 illustrates a simplified block diagram of a user device in accordance with one embodiment.

Now referring to FIG. 3, a user device 300 is shown according to one embodiment. Note that some of the elements shown in FIG. 3 may be implemented as hardware and/or software, according to various embodiments.

User device 300 is only one example of a suitable user device that may be used in the context of FIGS. 1-2, among others, and is not intended to suggest any limitation as to the scope of use or functionality of embodiments of the invention described herein. Regardless, referring again to FIG. 3, user device 300 is capable of being implemented and/or performing any of the functionality set forth hereinabove.

User device 300 is operational with numerous other general purpose and/or special purpose computing system environments or configurations. Examples of well-known computing systems, environments, and/or configurations that may be suitable for use with user device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

User device 300 may be described in the general context of computer system-executable instructions, such as program modules, being executed by a processing circuit, such as processing unit 302. Generally, program modules may include routines, programs, objects, components, logic, data structures, and so on that perform particular tasks or implement particular abstract data types. User device 300 may be utilized in distributed cloud computing environments where tasks are performed by remote processing devices that are linked through a communications network. In a distributed cloud computing environment, program modules may be located in both local and remote computer system storage media including memory storage devices.

As shown in FIG. 3, user device 300 may include many components, including, but not limited to, the processing unit 302 (which may include one or more processors), a system memory 304, and a bus 306 that couples various system components, including the system memory 304, to the processing unit 302.

Bus 306 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

User device 300 typically includes a variety of computer system readable media. Such media may be any available media that is accessible by processing unit 302, and it includes both volatile and non-volatile media, removable and non-removable media.

System memory 304 can include computer system readable media in the form of volatile memory (NVM), such as random access memory (RAM) 308 and/or cache memory 310, that may take any suitable form, such as hard disks in hard disk drives (HDDs), solid state memory in solid state drives (SSDs), flash memory, SSD arrays, flash memory arrays, etc., and/or others noted herein or known in the art. User device 300 may further include other removable/non-removable, volatile/non-volatile computer system storage media. By way of example only, storage system 312 may be provided for reading from and writing to a non-removable, non-volatile magnetic media (not shown and typically called a HDD). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM or other optical media may be provided. In such instances, each may be connected to bus 306 by one or more data media interfaces. As will be further depicted and described below, memory 304 may include at least one program product having a set (e.g., at least one) of program modules that are configured to carry out the functions of embodiments of the invention.

Program/utility 314, having a set (at least one) of program modules 316, may be stored in memory 304 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

User device 300 may also communicate with one or more external devices 318 such as a keyboard, a pointing device, a touchscreen display 320, etc.; one or more devices that enable a user to interact with user device 300; and/or any devices (e.g., network card, modem, etc.) that enable user device 300 to communicate with one or more other computing devices. Such communication can occur via Input/Output (I/O) interfaces 322. Still yet, user device 300 may communicate with one or more networks such as a local area network (LAN), a general wide area network (WAN), and/or a public network (e.g., the Internet) via network adapter 324. As depicted, network adapter 324 communicates with the other components of user device 300 via bus 306. It should be understood that although not shown, other hardware and/or software components may be used in conjunction with user device 300. Examples, include, but are not limited to: microcode, device drivers, redundant processing units, external disk drive arrays, RAID systems, tape drives, data archival storage systems, etc.

Many modern mobile devices have smaller displays in comparison to desktop and laptop computing devices. Moreover, these smaller displays often are also used as an input interface via touchscreen capabilities, which registers the touch of a user on a portion of the touchscreen. However, these touchscreens provide numerous notifications, alerts, warnings, announcements, messages, notices, notes, etc., (collectively referred to herein as "notifications") which may be displayed on any portion of the touchscreen, depending on which application is operating, the specific operating system, and desires of the programmer. These notifications are sometimes referred to as being push notifications, and they may "pop-up" on the touchscreen, e.g., be displayed at unexpected locations on the touchscreen. Moreover, other formats of interference are possible in operating systems and applications that may interfere with a user's intended screen touch which may include interactive touch overlays that will be triggered when the user inadvertently touches the interactive touch overlay.

Therefore, in some common-use instances, a notification such as an interactive touch overlay may be displayed in a location on the touchscreen where a user is imminently about to touch a surface of the touchscreen in an attempt to interact with some aspect of the touchscreen (e.g., an existing interactive touch component). This may result in a mis-touch, touch-typo, or errant touch that results in touching of the notification, e.g., interactive touch overlay, or an inability to interact with a desired portion of the touchscreen (such as the existing interactive touch component) which is completely or partially masked or overlaid by the displayed notification. These sorts of mis-touches occur more frequently as installed applications push more and more notifications to the touchscreen while the user is interacting with some aspect of the device, such as an application (web browser, office and/or productivity application, messaging application, game, tool, etc.), settings menu, home screen, etc.

Some modern touchscreens are able to detect when a user (typically with a finger or an implement for touching, such as a stylus) is hovering above a particular portion of the touchscreen (typically with the intent to touch this portion of the touchscreen imminently), without the user actually touching the surface of the touchscreen. By imminently, what is meat is within a subsequent amount of time that is less than a time in which a notification such as an interactive touch overlay is scheduled to be displayed. In several non-limiting examples, imminently may include 10 milliseconds (ms), 20 ms, 50 ms, 100 ms, 250 ms, one half second, one second, etc.

The direction of above is being used to indicate that the user is in close proximity to the surface of the touchscreen, with the assumption that the touchscreen is located below at least a portion of the user when being used. Of course, this is not required, as the touchscreen may be positioned horizontal from the user, above the user, or in any other direction from the user's point of view, with the touchscreen still functioning as intended. However, for the sake of these descriptions, the terms "hover" and "hovering above" indicate that the user has moved a finger or implement for touching in close proximity to a portion of a surface of the touchscreen, presumably with the intent to imminently touch the portion of the touchscreen.

This "hover" by the user is detected as a 2D coordinate along the surface of the touchscreen. In some embodiments, a third axis is used which describes the distance that the finger or touching implement of the user is located from the surface of the touchscreen, which may also be detected when utilizing a touchscreen display that is capable of sensing a position of a user's fingertip or touching implement even when not in contact with the surface of the touchscreen. Therefore, where the user is hovering above the surface of the touchscreen (and in some cases how far from the surface the user has positioned a finger or implement for touching) are available as 2D or 3D coordinates for use in analysis of the user's intent.

According to embodiments described in more detail herein, methods and mechanisms are presented to prevent the user from mis-touching a portion of the touchscreen by relying on user touch prediction to ensure that new touch fields do not interfere with current user interaction with the portion of the touchscreen currently being interacted with. In particular, hovering localization (where the user intends to touch a surface of the touchscreen) is used to determine when and where the user will imminently touch the touchscreen. Moreover, embodiments described herein analyze whether the portion of the touchscreen that will imminently be touched by the user includes an interactive screen component. In response to a determination that the portion of the touchscreen that will imminently be touched by the user includes an interactive screen component, placement of one or more pending notifications (notifications that will imminently be displayed to the touchscreen) is modified to avoid interference with the interactive screen component, thereby ensuring that the user's intended touching is not disrupted by display of the one or more notifications to the portion of the touchscreen near and/or overlapping with the interactive screen component.

Figure 4:
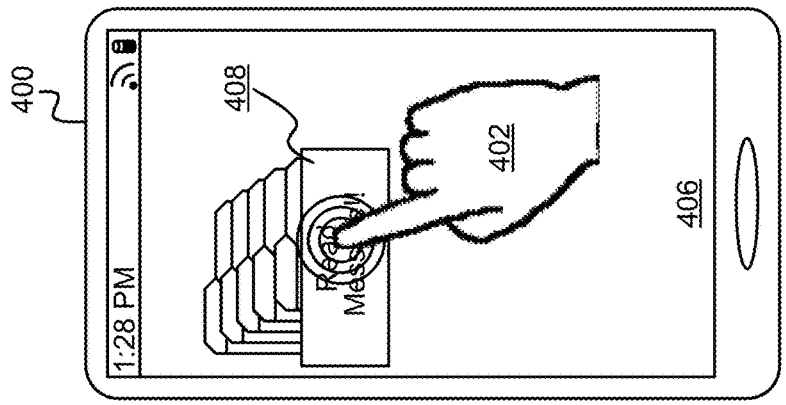
FIG. 4 shows a series of images of user interaction with a touchscreen, according to one embodiment.
Figure 4:
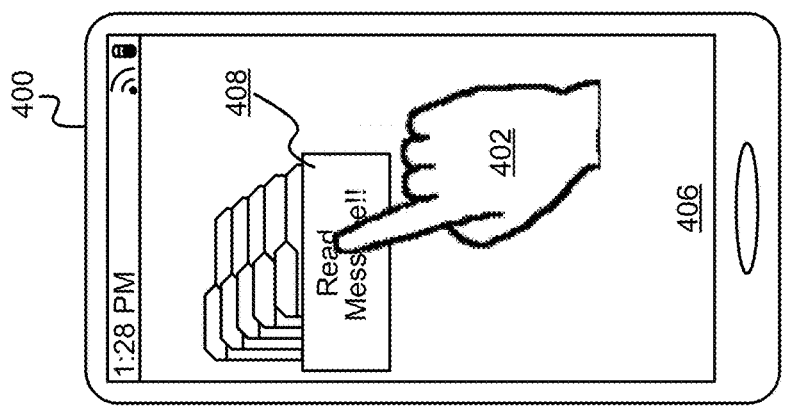
Figure 4:
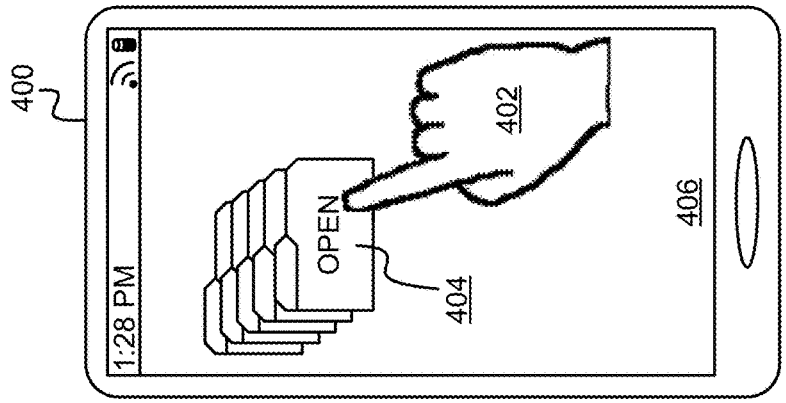

With reference to FIG. 4, an example of a situation where the embodiments described herein may be helpful to avoid user touch input mis-touches is shown according to one embodiment. As shown in the series of images, a smartphone 400 is being interacted with by a user 402. In the first scene, the user 402 is about to touch an interactive touch component 404 that is being displayed on a touchscreen 406 of the smartphone 400. In the second scene, just before the user 402 touches the surface of the touchscreen 406 to cause the interactive touch component 404 to effect some state change in an application or the operating system of the smartphone 400, a notification 408 (sometimes referred to as a "pop-up," push notification, alert, etc.) is displayed on the touchscreen 406 at a location on the screen that interferes with the user's ability to touch the underlaying interactive touch component 404. In the third scene, the user 402 touches the notification 408, resulting in a mis-touch, because the user 402 intended to touch the underlaying interactive touch component 404. These types of mis-touches may be avoided using some combination of embodiments described herein in more detail.

Figure 5:
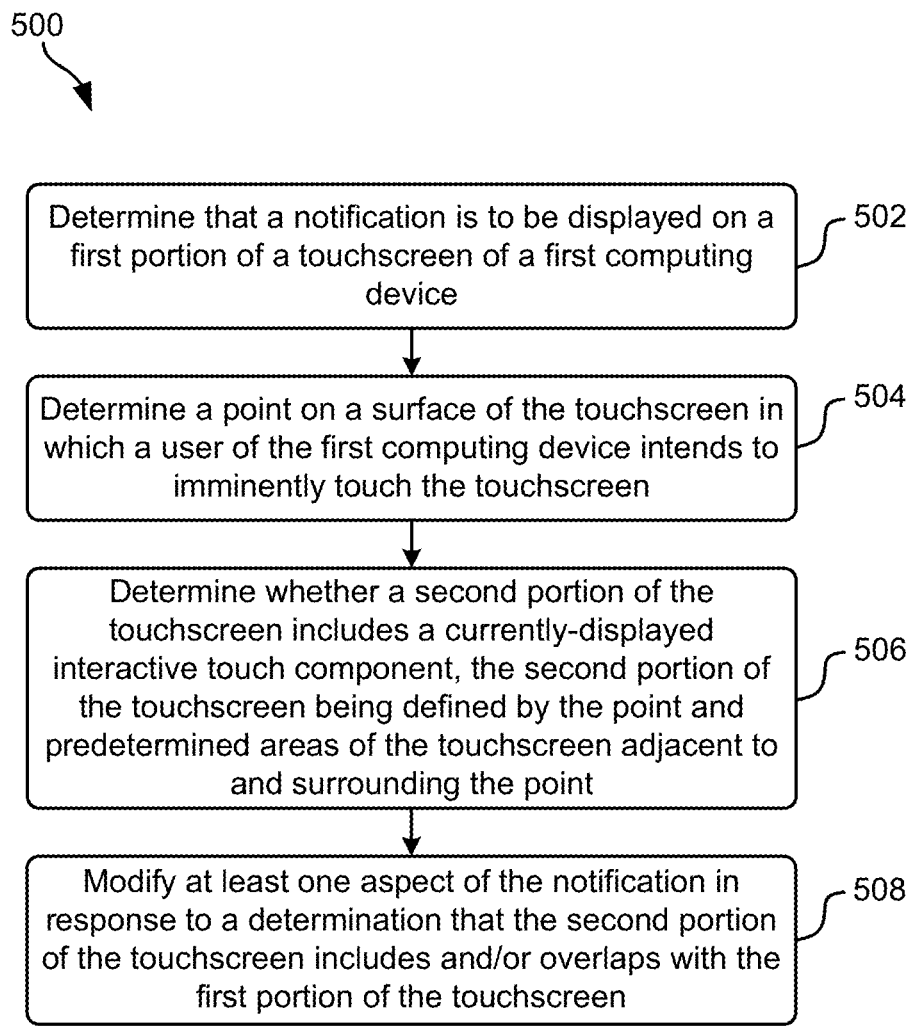
FIG. 5 shows a flowchart of a method, according to one embodiment.

Now referring to FIG. 5, a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a microprocessor, a mobile device, a smartphone, a tablet, a smartwatch, a wearable computing device, a graphics processor, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 500. Illustrative processors include, but are not limited to, a microprocessing unit (MPU), a central processing unit (CPU), an application specific integrated circuit (ASIC) an IC, a field programmable gate array (FPGA), etc., combinations thereof, or any other suitable computing device known in the art.

As shown in FIG. 5, method 500 may start with operation 502, where it is determined that a notification is to be displayed on a first portion of a touchscreen of a first computing device. The time frame to display the notification is variable, but in most instances the determination is made when the notification is requested to be displayed. This request for display of the notification may be intercepted, and this technique may be used to make the determination that a notification is to be displayed to the touchscreen of the first computing device, and a time at which the notification is to be displayed. The notification is a visual indicator of some kind, either interactive (selecting a portion of the notification causes an action to be performed, such as launching an application, navigating to a web page, opening a link referenced in the notification, etc.) or non-interactive (selection of any portion of the notification does not cause an action).

The first computing device may be any device that includes and/or makes use of a touchscreen, such as a smartphone, a tablet computer, a laptop computer, a desktop computer, a smart remote control, a smartwatch, virtual reality (VR) and/or augmented reality (AR) glasses, etc.

In operation 504, a point on a surface of the touchscreen in which a user of the first computing device intends to imminently touch the touchscreen is determined. The user is any person that is operating the first computing device. By "imminently," what is meant is that the touch will occur before the notification is to be displayed on the touchscreen or within one second after the notification is displayed on the touchscreen. This determination is made in order to ensure that the user touches what the user intends to touch on the screen, and that a notification is not placed at the point of touching prior to the user interacting with the content previously displayed at the point.

In operation 506, it is determined whether a second portion of the touchscreen includes a currently-displayed interactive touch component. The second portion of the touchscreen is defined by the point and predetermined areas of the touchscreen adjacent to and surrounding the point. Once the touch point is estimated or determined, method 500 works to understand whether the touch point will be interactive.

An interactive touch component is defined as any touch point on the touchscreen that will trigger a state change in an application and/or operating system of the first computing device. Moreover, application developers and/or programmers may annotate interactive areas in their applications, or such interactive areas may be learned over time by analyzing state changes in conjunction with touch interactions (screen state changes). In addition, these interactive touch components may be static (like a displayed "OK" button, keyboard letter, a URL bar in a web browser, etc.) or dynamic (such as a character in a gaming application moving in a scene, a target that moves to test the user's skill, a moving menu that opens and closes with visible movement, etc.).

In one embodiment, the predetermined areas of the touchscreen adjacent to and surrounding the point are configured to have a size that is able to account for a surface area of the touchscreen that is impacted by a fingertip of the user when the user touches the touchscreen. Information about the size of a typical touch by the user may be available through a history of touches, that may be analyzed to determine an appropriate size to make the predetermined areas of the touchscreen. Moreover, the predetermined areas of the touchscreen may be configured as a circle, oval, or some other suitable shape that extends from the point in all directions an equal amount (for a circle), or in a symmetrical fashion (for other shapes). The size of the circle or shape that is used to define the predetermined areas may be enlarged to account for some error or incomplete calculations in estimating the imminent touch position.

In operation 508, at least one aspect of the notification is modified in response to a determination that the second portion of the touchscreen includes and/or overlaps with the first portion of the touchscreen.

In one embodiment, the at least one aspect of the notification that is modified is a time in which the notification is displayed on the touchscreen. In this embodiment, because the notification may interfere with a user attempting to select the interactive touch component presently displayed on the touchscreen if the notification is displayed at its intended position on the screen, delaying the displaying of the notification may allow the user to interact with the interactive touch component as desired, with the notification being displayed after this interaction is complete. Therefore, the modification to the notification is accomplished by delaying the time in which the notification is displayed on the touchscreen until after the user touches the point on the surface of the touchscreen, and possibly after a predetermined period of time passes since the user touches the point on the surface of the touchscreen, such as 500 ms, 750 ms, 1 second, etc.

In another embodiment, the at least one aspect of the notification that is modified is a format of the notification. In this embodiment, the notification is initially a visual indication of some kind that will be displayed on the screen as a certain position that may interfere with the user's interaction with the interactive touch component. Therefore, in this embodiment the modification to the notification is accomplished by altering the format of the notification from the visual indication that is displayed on the touchscreen to another format that does not utilize any portion of the touchscreen. Some other formats that may be used include, but are not limited to, an audio indicator (a beep, song, voice, etc., to indicate the notification), providing the notification or some suitable variation thereof to a secondary display (such as a second screen of the first computing device), activation of a light (a single flash, constant lighting, flashing in a predetermined pattern, lighting in a predetermined color, etc.), vibration of the first computing device, etc.

In yet another embodiment, the at least one aspect of the notification that is modified is a device on which the notification is output. In this embodiment, the modification to the notification is accomplished by outputting the notification to a second computing device without displaying the notification on the touchscreen of the first computing device as initially requested. In this way, interaction by the user with the interactive touch component is not interrupted by the provision of the notification, as the second computing device is utilized to provide the notification, and the user may choose to interact with the second computing device at any time during or after interaction with the interactive touch component on the first computing device.

The second computing device may be any device that is configured to provide a notification in a desired format. Any suitable format may be used to output the notification on the second computing device, such as via an audio speaker, a screen, a touchscreen, vibration of the second computing device, a light on the second computing device, etc. The second computing device be of any known design, such as a mobile telephone, a smartphone, a tablet computer, a laptop computer, a desktop computer, a smart remote control, a smartwatch, VR and/or AR glasses or headset, headphones, earphones, smart speaker, etc.

In accordance with another embodiment, the at least one aspect of the notification that is modified is interaction priority of the notification when displayed on the touchscreen. The interaction priority indicates which layer of the touchscreen (each displayed element on the touchscreen may be considered to be in a layer, with more recently displayed or selected elements being shown above (visually) less recently selected or displayed elements in a series of layers) has priority to receive interactive input from the user (touching, swiping, etc.). Only the layer having priority will respond to the user touch input, while other layers (which possibly include one or more interactive touch components) will not respond to the touch input until their respective layer has priority. In this way, only the priority layer will be able to be interacted with by the user, and in this embodiment, the modification to the notification is accomplished by selectively setting the priority of the layer that includes the interactive touch component to have priority over the layer which includes the notification.

In a further embodiment, the notification may be selectable to have interaction priority over the interactive touch component in response to a long touch, a heavy touch (which may be registered using "force touch" or some other suitable measuring capability), a swipe, or some other discernible gesture by the user that is able to be received via the touchscreen input. This discernible gesture is predetermined to indicate that a lower displayed or underlaying element (in a first case, the interactive touch component) on the touchscreen is being interacted with instead of a higher displayed or overlaying element (in the first case the notification), while normal touching (tapping and other gestures that are not predetermined to cause selection of an underlaying element) causes interaction with the notification. Alternatively, in response to the interactive touch component being displayed on the touchscreen above the notification and having an overlaying interaction priority, receiving the discernible gesture causes interaction with the underlaying notification to take precedence over interaction with the overlaying interactive touch component, while normal touching (tapping and other gestures that are not predetermined to cause selection of an underlaying element) causes interaction with the interactive touch component.

In another embodiment, the at least one aspect of the notification that is modified is placement of the notification when displayed on the touchscreen. Because initially, the notification was to be displayed in an area of the touchscreen that would interfere with the user's interaction with the interactive touch component, the location of display may be altered to alleviate and/or eliminate any interference. Therefore, in this embodiment, the modification to the notification is accomplished by modifying and/or changing the placement of the notification from the first portion of the touchscreen to a third portion of the touchscreen. In this approach, the third portion of the touchscreen does not overlap with the interactive touch component.

In a further approach, the third portion of the touchscreen may be adjacent to the second portion of the touchscreen without overlapping the second portion, thereby ensuring that the display of the notification is within a current field of view of the user (who is interacting with the interactive touch component in the first portion).

In another further approach, the third portion of the touchscreen may be positioned as far from the second portion of the touchscreen as possible, given the screen dimensions, sizes of the notification and interactive touch component, screen resolution, etc. This allows for the most caution in eliminating mis-touches by the user.

According to another embodiment, the placement of the notification may be in an area that partially or completely surrounds the interactive touch component (like a circle with a hole in the middle for the interactive touch component).

In yet another embodiment, the placement of the notification may be modified to be placed directly in the path of the user's estimated touch point, thereby ensuring that the user touches the notification instead of any other displayed elements on the touchscreen.

The method 500 may further include determining a location of a fingertip of the user above the touchscreen, a velocity of the fingertip (and/or an acceleration of the fingertip in a vector direction), and a trajectory of the fingertip (moving toward the surface of the touchscreen, away from the surface of the touchscreen, or along a plane parallel to the surface of the touchscreen laterally) to determine the point on the surface of the touchscreen in which the user intends to imminently touch the touchscreen and in some instances, an estimated time of when the contact will occur.

Of course, in this embodiment, these determinations may be made for any object that is presently about to interact with the touchscreen, such as a thumb, stylus, etc., and not limited to just a fingertip.

Some conventional systems are capable of obtaining 3D (x, y, z) coordinates of a fingertip location relative to a fixed point on a touchscreen. By leveraging these capabilities, data points of fingertip position in (x, y, z) coordinates may be sampled at fixed intervals (every 2 ms, 5 ms, 10 ms, 50 ms, etc.) to determine the trajectory of the fingertip. Moreover, past (historic) and current fingertip touch sample information may be used to further refine the presumed contact area on the surface of the touchscreen in one approach. This analysis may utilize any known fitting algorithms, such as derivatives, least squares fitting, average trajectory, etc. In addition, a fingertip trajectory contact point estimate may also take into account nearest interactive touch component(s) that are currently displayed on the touchscreen to determine the most likely ending point on the surface of the touchscreen for a given set of data samples that indicate fingertip movement toward and/or across the touchscreen, as an attempt to "snap to fit" the movement to an intended target.

In one embodiment, the location of the fingertip location relative to the fixed point on the touchscreen may be estimated using a camera. The camera may be built into the device that comprises the touchscreen (such as a front-facing camera on a smartphone, or the camera may be located on an external device that is configured to communicate with the device that comprises the touchscreen. A couple of instances where hover detection is implemented in a device that is capable of detecting fingertip location in 3D coordinates includes Samsung® Air View™ and Sony® Floating Touch™.

In cases where the distance from the touchscreen measurement (z coordinate) is not available, trajectory may be further refined based on time of movement and the lateral and vertical measurements (x, y coordinates). In other words, based on a current fingertip location and a current velocity/acceleration, the time in which the fingertip will make contact with the surface of the touchscreen may be estimated, because the fingertip accelerates away from contact, and slows toward the next contact. Therefore, by measuring the acceleration (or instant velocity) of the fingertip, the stopping point may be estimated as a certain amount of time from the current time, and the resulting position on the touchscreen may be estimated.

Method 500 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 500.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
determining that a notification is to be displayed on a first portion of a touchscreen of a first computing device;
determining a point on a surface of the touchscreen in which a user of the first computing device intends to imminently touch the touchscreen;
determining whether a second portion of the touchscreen includes a currently-displayed interactive touch component, the second portion of the touchscreen being defined by the point and predetermined areas of the touchscreen adjacent to and surrounding the point; and
modifying at least one aspect of the notification in response to a determination that the second portion of the touchscreen includes and/or overlaps with the first portion of the touchscreen.

2. The method as recited in claim 1, wherein the at least one aspect of the notification is a time in which the notification is displayed on the touchscreen, and wherein modifying the at least one aspect of the notification comprises delaying the time in which the notification is displayed on the touchscreen until after the user touches the point on the surface of the touchscreen.

3. The method as recited in claim 1, wherein the at least one aspect of the notification is a format of the notification, and wherein modifying the at least one aspect of the notification comprises altering the format of the notification from a visual indication that is displayed on the touchscreen to another format that does not utilize any portion of the touchscreen.

4. The method as recited in claim 1, wherein the at least one aspect of the notification is a device on which the notification is output, and wherein modifying the at least one aspect of the notification comprises outputting the notification to a second computing device provided that the notification is not displayed on the touchscreen of the first computing device.

5. The method as recited in claim 1, wherein the at least one aspect of the notification is interaction priority of the notification when displayed on the touchscreen, and wherein modifying the at least one aspect of the notification comprises selectively causing the interactive touch component to have priority over the notification.

6. The method as recited in claim 5, wherein the notification is selectable over the interactive touch component in response to a long touch and/or a heavy touch.

7. The method as recited in claim 1, wherein the at least one aspect of the notification is placement of the notification when displayed on the touchscreen, and wherein modifying the at least one aspect of the notification comprises modifying the placement of the notification from the first portion to a third portion of the touchscreen, wherein the third portion of the touchscreen does not overlap with the interactive touch component.

8. The method as recited in claim 7, wherein the third portion of the touchscreen is adjacent to the second portion of the touchscreen.

9. The method as recited in claim 7, wherein the third portion of the touchscreen is as far from the second portion of the touchscreen as possible.

10. The method as recited in claim 1, wherein the predetermined areas of the touchscreen adjacent to the point have a size that is configured to account for a surface area of the touchscreen that is impacted by a fingertip of the user.

11. The method as recited in claim 1, further comprising determining a location of a fingertip of the user, a velocity of the fingertip, and a trajectory of the fingertip to determine the point on the surface of the touchscreen in which the user intends to imminently touch the touchscreen.

12. A computer program product, the computer program product comprising a computer readable storage medium having program instructions embodied therewith, wherein the computer readable storage medium is not a transitory signal per se, the embodied program instructions being executable by a processing circuit to cause the processing circuit to:
determine, by the processing circuit, that a notification is to be displayed on a first portion of a touchscreen of a first computing device;
determine, by the processing circuit, a point on a surface of the touchscreen in which a user of the first computing device intends to imminently touch the touchscreen;
determine, by the processing circuit, whether a second portion of the touchscreen includes a currently-displayed interactive touch component, the second portion of the touchscreen being defined by the point and predetermined areas of the touchscreen adjacent to and surrounding the point; and
modify, by the processing circuit, at least one aspect of the notification in response to a determination that the second portion of the touchscreen includes and/or overlaps with the first portion of the touchscreen.

13. The computer program product as recited in claim 12, wherein the at least one aspect of the notification is a time in which the notification is displayed on the touchscreen, and wherein the embodied program instructions that cause the processing circuit to modify the at least one aspect of the notification further cause the processing circuit to delay the time in which the notification is displayed on the touchscreen until after the user touches the point on the surface of the touchscreen.

14. The computer program product as recited in claim 12, wherein the at least one aspect of the notification is a format of the notification, and wherein the embodied program instructions that cause the processing circuit to modify the at least one aspect of the notification further cause the processing circuit to alter the format of the notification from a visual indication that is displayed on the touchscreen to another format that does not utilize any portion of the touchscreen.

15. The computer program product as recited in claim 12, wherein the at least one aspect of the notification is a device on which the notification is output, and wherein the embodied program instructions that cause the processing circuit to modify the at least one aspect of the notification further cause the processing circuit to output the notification to a second computing device provided that the notification is not displayed on the touchscreen of the first computing device.

16. The computer program product as recited in claim 12, wherein the at least one aspect of the notification is interaction priority of the notification when displayed on the touchscreen, and wherein the embodied program instructions that cause the processing circuit to modify the at least one aspect of the notification further cause the processing circuit to selectively cause the interactive touch component to have priority over the notification.

17. A system, comprising:
a processing circuit and logic integrated with and/or executable by the processing circuit, the logic when executed by the processing circuit causes the processing circuit to:
determine that a notification is to be displayed on a first portion of a touchscreen of a first computing device;
determine a point on a surface of the touchscreen in which a user of the first computing device intends to imminently touch the touchscreen;
determine whether a second portion of the touchscreen includes a currently-displayed interactive touch component, the second portion of the touchscreen being defined by the point and predetermined areas of the touchscreen adjacent to and surrounding the point; and
modify at least one aspect of the notification in response to a determination that the second portion of the touchscreen includes and/or overlaps with the first portion of the touchscreen.

18. The system as recited in claim 17, wherein the at least one aspect of the notification is a time in which the notification is displayed on the touchscreen, and wherein the logic that causes the processing circuit to modify the at least one aspect of the notification further causes the processing circuit to delay the time in which the notification is displayed on the touchscreen until after the user touches the point on the surface of the touchscreen.

19. The system as recited in claim 17, wherein the at least one aspect of the notification is a format of the notification, and wherein the logic that causes the processing circuit to modify the at least one aspect of the notification further causes the processing circuit to alter the format of the notification from a visual indication that is displayed on the touchscreen to another format that does not utilize any portion of the touchscreen.

20. The system as recited in claim 17, wherein the at least one aspect of the notification is interaction priority of the notification when displayed on the touchscreen, and wherein the logic that causes the processing circuit to modify the at least one aspect of the notification further causes the processing circuit to selectively cause the interactive touch component to have priority over the notification.

* * * * *